United States Patent
Adar

(10) Patent No.: US 10,755,590 B2
(45) Date of Patent: *Aug. 25, 2020

(54) METHOD AND SYSTEM FOR AUTOMATICALLY PROVIDING GRAPHICAL USER INTERFACES FOR COMPUTATIONAL ALGORITHMS DESCRIBED IN PRINTED PUBLICATIONS

(71) Applicant: The Joan and Irwin Jacobs Technion-Cornell Institute, New York, NY (US)

(72) Inventor: Simon Adar, Tenafly, NJ (US)

(73) Assignee: THE JOAN AND IRWIN JACOBS TECHNION-CORNELL INSTITUTE, New York, NY (US)

(*) Notice: Subject to any disclaimer, the term of this patent is extended or adjusted under 35 U.S.C. 154(b) by 116 days.

This patent is subject to a terminal disclaimer.

(21) Appl. No.: 15/655,512

(22) Filed: Jul. 20, 2017

(65) Prior Publication Data

US 2017/0316706 A1    Nov. 2, 2017

Related U.S. Application Data

(63) Continuation-in-part of application No. 15/185,538, filed on Jun. 17, 2016, now Pat. No. 9,965,256, and
(Continued)

(51) Int. Cl.
*G09B 5/06* (2006.01)
*G09B 25/00* (2006.01)
(Continued)

(52) U.S. Cl.
CPC ............... *G09B 5/06* (2013.01); *G06F 8/30* (2013.01); *G06F 8/33* (2013.01); *G06F 8/36* (2013.01);
(Continued)

(58) Field of Classification Search
CPC ..... G06F 8/30; G06F 8/36; G06F 8/38; G06F 9/45504; G06F 11/3428; G09B 5/06; G09B 25/00
(Continued)

(56) References Cited

U.S. PATENT DOCUMENTS 6,546,418 B2    4/2003  Schena et al.
6,775,824 B1*   8/2004  Osborne, II ........ G06F 11/3664
                                                        714/46
(Continued)

FOREIGN PATENT DOCUMENTS

WO    2001077882 A1    10/2001
WO    2012054016 A1     4/2012
WO    2015020722 A1     2/2015

OTHER PUBLICATIONS

Arcuri et al., "A Memetic Algorithm for Test Data Generation of Object-Oriented Software", IEEE, 2007, 8pg. (Year: 2007).*
(Continued)

*Primary Examiner* — Ryan D. Coyer
(74) *Attorney, Agent, or Firm* — M&B IP Analysts, LLC

(57) ABSTRACT

A system and method for providing graphical user interfaces based on computational algorithms described in printed publications. The method includes analyzing the printed publication to determine algorithm-indicating information of the computational algorithm; identifying at least one input required by the computational algorithm and at least one output to be output by the computational algorithm; generating, based on the at least one input and the at least one output, at least one GUI element; and generating executable code, wherein the executable code includes instructions for causing a display of the GUI including the at least one GUI element.

19 Claims, 4 Drawing Sheets

Related U.S. Application Data a continuation-in-part of application No. 15/185,513, filed on Jun. 17, 2016, now Pat. No. 9,971,573.

(60) Provisional application No. 62/366,329, filed on Jul. 25, 2016, provisional application No. 62/271,800, filed on Dec. 28, 2015, provisional application No. 62/181,451, filed on Jun. 18, 2015.

(51) Int. Cl.
| | | |
|---|---|---|
| *G06F 8/33* | (2018.01) | |
| *G06F 8/30* | (2018.01) | |
| *G06F 11/34* | (2006.01) | |
| *G06F 8/36* | (2018.01) | |
| *G06F 9/455* | (2018.01) | |
| *G06F 8/38* | (2018.01) | |

(52) U.S. Cl.
CPC ............ *G06F 8/38* (2013.01); *G06F 9/45504* (2013.01); *G06F 11/3428* (2013.01); *G09B 25/00* (2013.01)

(58) Field of Classification Search
USPC .......................................................... 717/100
See application file for complete search history.

(56) References Cited

U.S. PATENT DOCUMENTS

| | | | | |
|---|---|---|---|---|
| 7,003,777 | B2* | 2/2006 | Hines | .................... G06F 8/36 |
| | | | | 719/316 |
| 7,159,224 | B2* | 1/2007 | Sharma | .................... G06F 8/10 |
| | | | | 719/310 |
| 8,373,724 | B2 | 2/2013 | Ratnakar et al. | |
| 8,510,712 | B1* | 8/2013 | Killmar, III | ........ G06F 11/3684 |
| | | | | 717/124 |
| 8,527,943 | B1* | 9/2013 | Chiluvuri | .................. G06F 8/36 |
| | | | | 717/106 |
| 8,756,571 | B2* | 6/2014 | Bergman | ............ G06F 11/3684 |
| | | | | 717/124 |
| 9,047,542 | B2 | 6/2015 | Graushar et al. | |
| 2002/0069240 | A1 | 6/2002 | Berk | |
| 2003/0142819 | A1* | 7/2003 | Bellocchio | .......... G06F 11/3608 |
| | | | | 380/28 |
| 2005/0278622 | A1 | 12/2005 | Betts et al. | |
| 2007/0033440 | A1* | 2/2007 | Tillmann | ............ G06F 11/3684 |
| | | | | 714/38.14 |
| 2007/0150821 | A1 | 6/2007 | Thunemann et al. | |
| 2007/0272733 | A1 | 11/2007 | Spector | |
| 2008/0007779 | A1 | 1/2008 | Gennip et al. | |
| 2008/0091938 | A1* | 4/2008 | Pedersen | ................ G06F 21/602 |
| | | | | 713/153 |
| 2009/0108057 | A1 | 4/2009 | Mu et al. | |
| 2009/0158153 | A1 | 6/2009 | Courteaux | |
| 2011/0107316 | A1 | 5/2011 | Gutz et al. | |
| 2012/0054716 | A1* | 3/2012 | Tailliez | ...................... G06F 8/61 |
| | | | | 717/107 |
| 2013/0132774 | A1* | 5/2013 | Somendra | ........... G06F 11/3688 |
| | | | | 714/32 |
| 2013/0276068 | A1 | 10/2013 | Alwar | |
| 2013/0298109 | A1* | 11/2013 | Trinchini | .................. G06F 8/71 |
| | | | | 717/121 |
| 2015/0128105 | A1* | 5/2015 | Sethi | ......................... G06F 8/36 |
| | | | | 717/106 |
| 2016/0026442 | A1* | 1/2016 | Chhaparia | ................ G06F 21/31 |
| | | | | 717/139 |

OTHER PUBLICATIONS

Marinescu et al., "COVRIG: A Framework for the Analysis of Code, Test, and Coverage Evolution in Real Software", ACM, 2014, 12pg. (Year: 2014).*

The International Search Report and the Written Opinion of the International Searching Authority for PCT/US2017/043120, ISA/RU, Moscow, RU, dated Nov. 2, 2017.

Arcuri, et al., "A Memetic Algorithm for Test Data Generation of Object-Oriented Software", IEEE Congress on Evolutionary Computation, 2007, pp. 2048-2055.

Marinescu, et al., "COVRIG: A Framework for the Analysis of Code, Test, and Coverage Evolution in Real Software", ACM, 2014, Department of Computing, Imperial College London, UK, pp. 93-104.

The International Search Report and The Written Opinion for PCT/US2016/038053, ISA/RU, Moscow, Russia, dated Oct. 13, 2016.

The International Searching Authority and the Written Opinion for PCT/US2016/038050, ISA/RU, Moscow, Russia, dated Oct. 13, 2016.

The European Search Report for EP Application No. 16812509.4, The European Patent Office, The Hague, Date of Completion: Jan. 15, 2019.

Tsui et al., "Essentials of Software Engineering, third edition," Jan. 2014, pp. 240-241.

Notice of Deficiencies for EP Application No. 16812509.4, Sep. 5, 2019, EPO, Munich, Germany.

* cited by examiner

400

| Name: | John Smith | | |
|---|---|---|---|
| Assignment: | 1 | 2 | 3 |
| Grade: | 80 | 90 | 100 |

Average: 90

FIG. 4

METHOD AND SYSTEM FOR AUTOMATICALLY PROVIDING GRAPHICAL USER INTERFACES FOR COMPUTATIONAL ALGORITHMS DESCRIBED IN PRINTED PUBLICATIONS

CROSS REFERENCE TO RELATED APPLICATIONS

This application claims the benefit of U.S. Provisional Application No. 62/366,329 filed on Jul. 25, 2016. This application is also a continuation-in-part (CIP) of U.S. patent application Ser. No. 15/185,538 filed on Jun. 17, 2016, now pending, which claims the benefit of U.S. Provisional Application No. 62/181,451 filed on Jun. 18, 2015, and of U.S. Provisional Application No. 62/271,800 filed on Dec. 28, 2015. This application is also a CIP of U.S. patent application Ser. No. 15/185,513 filed on Jun. 17, 2016, now pending, which claims the benefit of the above-mentioned U.S. Provisional Applications Nos. 62/181,451 and 62/271,800. The contents of the above-noted applications are hereby incorporated by reference.

TECHNICAL FIELD

The disclosure generally relates to the field of computer programming tools, and more specifically to automatically providing GUIs for programs described in code-based publications.

BACKGROUND

As the development of software applications evolves, programming accurate and efficient code has become a real challenge. A typical software application interfaces with different modules, e.g., using APIs, and should be programmed to enable its execution on different platforms and operating systems. For example, a software application (app) should be available for execution over different types of operating systems such as Linux®, Mac OS® and Windows®. Furthermore, as execution of many software applications has been migrated to cloud computing infrastructures, the code should be written such that its execution is supported by any computing environments in the cloud infrastructure. Thus, in sum, the complexity of software applications imposes a real challenge on programmers.

In order to enable the rapid creation, setup, and deployment of applications, resources that include "off-the-shelf" functions, algorithms, and pieces of codes are available. Such resources range from academic and scientific publications to code repositories (e.g., GitHub). However, such resources are limited in that they cannot provide executable code that can be easily evaluated and integrated in a software application or project being researched or developed. For example, a scientific publication (e.g., in an IEEE® article) would likely include a textual description of an algorithm or at best its pseudo code rather than the code itself. Further, even if such a resource provides executable code, such code may not be compatible with the software application or project as is.

Learning and evaluating code-focused scientific publications and text books (collectively referred to as "printed publications") can be difficult and limiting. That is, printed publications generally do not include any code that can be immediately executed on a computing environment that the software application is developed for. At best, printed publications include a detailed description of the code, some samples, or pseudo code. The reader has no way to "experience" the code or to otherwise judge whether the code described in the printed publications would serve its purpose in a computer program once deployed in a computing environment.

Thus, to evaluate the functionality and performance of the algorithm, executable code should be coded and tested in that computing environment. This is a time consuming and error prone task. It should be emphasized that drawbacks of printed publications as discussed herein are equally relevant when the printed publications are electronic versions. That is, there is no way to readily evaluate the functionality and performance of the algorithm or code, as described in either a tangible printed or an electronic version of a publication, in a computing environment.

Publishers of printed and electronic publications suffer from loss of revenue as researchers increasingly turn to search engines for information. A major concern for publishers is that printed publications (and particularly textbooks) will become obsolete. This is mainly due to the fact that text books and publications currently do not offer any mechanisms that can be helpful to programmers or researchers when developing algorithms.

Furthermore, due to the voluminous amount of academic and scientific publications, open-source codes, and other algorithm resources, it is almost impossible to search for the right algorithm that would fit into a software application and would perform an intended function. Additionally, it can be difficult to organize additional references or information obtained from sources other than a specific printed or electronic publication.

Moreover, some programs described in printed publications are intended or otherwise readily suited for execution using a graphical user interface (GUI). That is, some such programs require user input and would benefit from GUIs for receiving such user inputs. The algorithms presented in a publication do not necessarily include instructions for causing display of a GUI for receiving information. Thus, a user must typically manually review the publication to identify required inputs and outputs, and must manually program the required GUI. This process is subject to human error, and further prevents ready adaptability and testing of programs presented in printed publications.

It would therefore be advantageous to provide a solution that overcomes the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing a graphical user interface (GUI) based on a computational algorithm described in a printed publication. The method comprises: analyzing the printed publication to determine algorithm-indicating information of the computational algorithm; identifying at least one input required by the computational algorithm and at least one output to be output by the computational algorithm; generating, based on the at least one input and the at least one output, at least one GUI element; and generating executable code, wherein the executable code includes instructions for causing a display of the GUI including the at least one GUI element.

Certain embodiments disclosed herein also include a non-transitory computer readable medium having stored thereon causing a processing circuitry to execute a process, the process comprising analyzing the printed publication to determine algorithm-indicating information of the computational algorithm; identifying at least one input required by the computational algorithm and at least one output to be output by the computational algorithm; generating, based on the at least one input and the at least one output, at least one GUI element; and generating executable code, wherein the executable code includes instructions for causing a display of the GUI including the at least one GUI element.

Certain embodiments disclosed herein also include a system for providing a graphical user interface (GUI) based on a computational algorithm described in a printed publication. The system comprises: a processing circuitry; and a memory, the memory containing instructions that, when executed by the processing circuitry, configure the system to: analyze the printed publication to determine algorithm-indicating information of the computational algorithm; identify at least one input required by the computational algorithm and at least one output to be output by the computational algorithm; generate, based on the at least one input and the at least one output, at least one GUI element; and generate executable code, wherein the executable code includes instructions for causing a display of the GUI including the at least one GUI element.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

FIG. 4 is a diagram illustrating a sample GUI provided by the disclosed embodiments.

DETAILED DESCRIPTION

Figure 1:
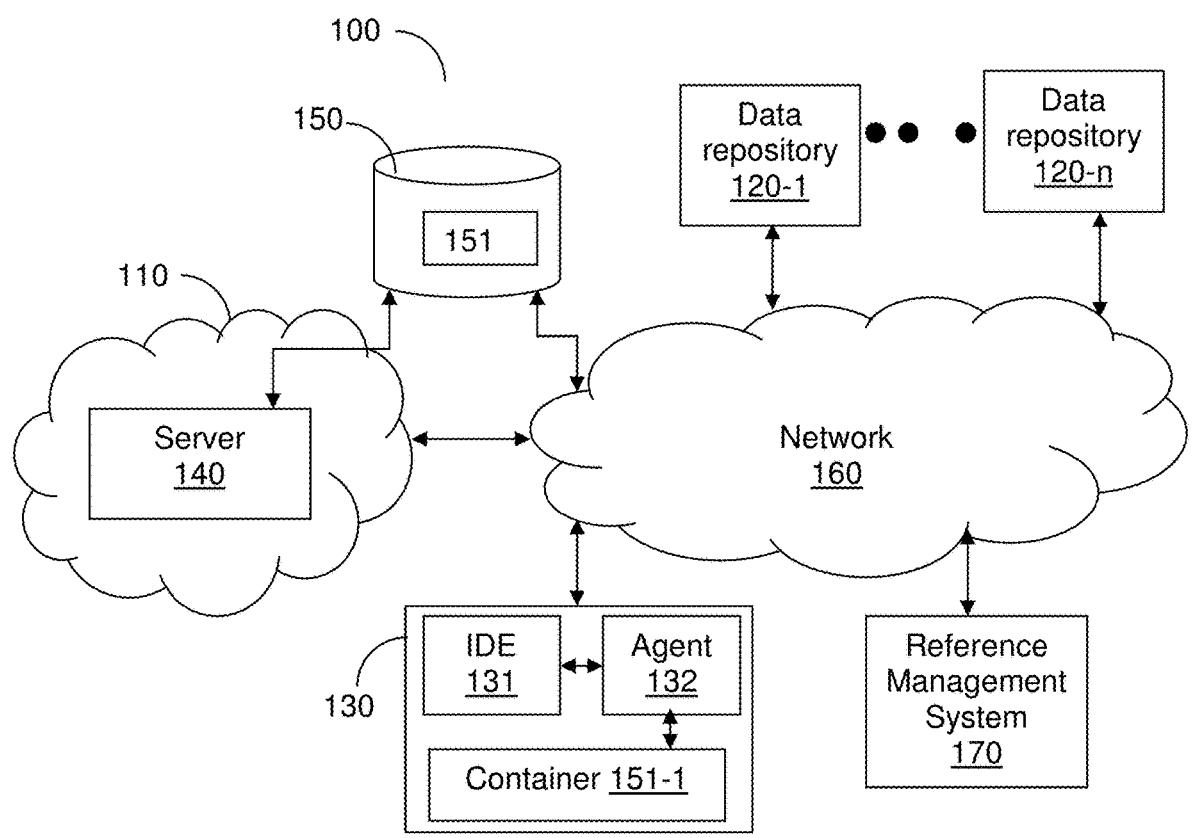
FIG. 1 is a network diagram utilized to describe the disclosed embodiments.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

The embodiments disclosed herein include a system and method for providing graphical user interfaces (GUIs) based on computational algorithms described in printed publications. The printed publications may be physical or digital publications, and may include, but are not limited to, textual descriptions of algorithms, pseudo-code, sample portions of code, combinations thereof, and the like. The method includes identifying potential computational algorithms in a printed publication, determining algorithm-indicating information in the potential computational algorithms, identifying user inputs of the potential algorithms as well as outputs of the potential algorithms, identifying a type of each user input, generating at least one GUI element for the potential algorithms, and generating executable code, wherein the executable code includes instructions causing a display of the at least one GUI element.

The embodiments disclosed herein allow for automatically implementing algorithms described in printed publications without requiring manual incorporation into existing programs. As a result, the effort required by a user testing the algorithms is decreased. Further, efficiency of testing is increased and error rates (e.g., due to incompatibilities between the manually written algorithm and the existing program) may be decreased. Moreover, execution of automatically generated code as described herein may result in graphical user interfaces that are highly consistent even among different algorithms.

FIG. 1 is an example network diagram 100 utilized to describe the various disclosed embodiments. The network diagram 100 includes a cloud computing platform 110, a plurality of data repositories 120-1 through 120-N (hereinafter referred to individually as a data repository 120 or collectively as data repositories 120), a computing device 130, a server 140, and a data warehouse 150. The various elements of the system 100 are communicatively connected to a network 160. The network 160 may be, for example, a wide area network (WAN), a local area network (LAN), the Internet, and the like.

The cloud computing platform 110 may be a private cloud, a public cloud, or a hybrid cloud providing computing resources to applications or services executed therein. The data repositories 120 are resources including computational algorithms. A computational algorithm is any algorithm that can be utilized in the field of mathematics or computer science. Such an algorithm is typically defined as a self-contained step-by-step set of operations to be performed. As an example, a computational algorithm may be designed to perform calculation, data processing and analysis (such as, image processing, transaction processing), automated reasoning, and more.

The computational algorithms may be included in printed publications. Such printed publications may include, but are not limited to, any physically printed and digital versions of text books, scientific or academic publications (e.g., articles or magazines), blogs, manuals, tutorials (textual or video), and so on. A computational algorithm saved in a data repository may be described as a pseudo code, one or more mathematical equations, a written description, a code sample or set of code samples, or any combination thereof.

The computing device 130 may be, for example, a personal computer, a laptop, a tablet computer, a smartphone, and the like. The computing device 130 may include an integrated development environment (IDE) 131 or any other tool that allows computer programmers to develop software. The computing device 130 further includes an agent 132 locally installed and executed over the computing device 130. In an embodiment, the agent 132 may be configured to perform the embodiments discussed in greater detail herein below.

According to various embodiments, the data warehouse 150 includes containers 151 (or image containers) associated with printed publications stored in the data repositories 120. Specifically, each printed publication can be associated with one or more containers 151. A container 151 includes code as well as software resources needed for the proper execution of the code in a target computing environment. In an embodiment, the containers may be generated based on algorithms described or otherwise featured in printed publications as described further in the above-referenced U.S. patent application Ser. No. 15/185,538, the contents of which are incorporated by reference.

In an embodiment, each container 151 is identified by a container identifier. Each container identifier is mapped to a printed publication that describes a computational algorithm that the container identifier can execute. In one implementation, the server 140 maintains a table for mapping container identifiers to printed publications (e.g., based on the subject matter of the printed publications). In another embodiment, the container identifier can also be stored as an additional identifier of the printed publication. Thus, the mapping may be based on the appearance of the container identifier within printed publications. The container identifier is utilized to retrieve the respective container from the data warehouse 150.

In an embodiment, when the printed publication is displayed on the computing device 130 (to be reviewed by the user), it is checked if there is a container associated with that publication, i.e., if there is a container identifier that is mapped to the publication displayed on the device 130. If there is a prior association ("pre-association") between a container and a publication, a link (or a button) to the container may be displayed. An example display of a link to the container is described further herein below with respect to FIGS. 2A and 2B. Otherwise, if there is no prior association between a container and a publication, such an association may be created on-the-fly. Various techniques for creating on-the-fly associations between containers and printed publications are described further herein below.

In another embodiment, an associated container is provided to the user via, for example, a matrix barcode (such as, e.g., a QR code) appearing in the printed publication. Thus, a user, by means of a user device 130, can access the containers 151 in the data warehouse 150 by simply scanning the barcode. To this end, the barcode may be encoded with a container identifier of any container related to the algorithm(s) mentioned in the publication. This embodiment may allow a user reading a physical version of a printed publication to access code described therein.

In an embodiment, the containers 151 accessed through the barcode or the "container button" are retrieved and saved in the server 140 to allow for execution by the computing device 130. In another embodiment, the associated containers 151 are retrieved by the agent 132. In an embodiment, all such containers 151 are listed in a user account, allowing the user to subsequently access and execute the containers.

According to various embodiments, the agent 132 is configured to interface with the server 140 to retrieve at least one container 151 associated with one or more computational algorithms mentioned in a printed publication currently being reviewed by a user of the device 130. The retrieved container 151 may be further stored in the computing device 130.

Various techniques can be utilized to determine which container(s) may be associated with the printed publication. When a printed publication is pre-associated with a container, then the respective container identifier may be encoded in the barcode or included in the publication's metadata. Thus, when the barcode is scanned or when the publication is uploaded to the user device, the container identifier is extracted. For example, using the extracted container identifier, the respective container can be retrieved from the data warehouse 150.

When there is no pre-association between a container and printed publication, the server 140 or the agent 132 may be configured to search for a container matching the printed publication. To this end, an association between a content identifier and the printed publication may be generated.

In an embodiment, the printed publication is scanned to search for details that uniquely identify a computational algorithm. For example, such details may include a pseudo code, a code sample, an executable code, equations, and so on. Then, using the identifying details, a search through the data warehouse 150 is performed. A container identifier of a container that best matches the identifying details is returned. The returned container identifier is then associated with the printed publication.

It should be noted that associating a container identifier with a printed publication can be performed in the background, i.e., while one of the printed publications is being displayed on the user device. To this end, the data repositories 120 are crawled through, and any printed publications encountered during the crawl that have not been associated with a container identifier are further analyzed to detect one or more containers matching the computational algorithm described therein.

In an embodiment, the agent 132 is also configured to integrate the retrieved container(s) in a software program developed by the user. An example of this would be using the IDE 131. According to this embodiment, the integration of the containers includes compiling or loading containers into code provided by the IDE 131.

As a non-limiting example, a user reads an article about an algorithm for image compression on a webpage, which is being discussed with a reference to example pseudo code. The pseudo code in the article is associated with a container 151, which contains a sample of the executable code for compressing images. Accordingly, a button for the container 151 may be displayed in the webpage featuring the article. In response to a user clicking or otherwise interacting with the button, the agent 132 is configured to download the container 151, to integrate the downloaded container 151 in the IDE 131, and to execute the container's 151 code in a computing environment supported by the container's code. In an embodiment, upon downloading a container 151, a link is created between the textual description (and any related drawings) and the respective code included in the container, thereby facilitating ease and speed of navigation between the code and the textual description.

In a further embodiment, output generated by execution of a container is indexed. This indexing allows for linking an output to a specific block of code (in the container) that whose execution resulted in generation of the output.

The indexing of the outputs further allows for caching results of container executions. To this end, the agent 132 is configured to identify previous execution results from one or more containers (or a specific code block or blocks), and to retrieve the results without re-executing such container(s). This retrieval of previous results allows for shortening the runtime and minimizing the utilization of computing resources.

It should be noted that the printed publications can be displayed on the device 130 by any type of software program equipped with viewing capabilities. Examples for such software programs include, but are not limited to, a web browser (such as Chrome®, Internet Explorer®, etc.), Adobe Acrobat®, Microsoft Word®, and the like. In contrast, once downloaded to the device 130, the container 151 is opened in an environment (e.g., the IDE 131) that allows editing, executing, debugging, or a combination thereof, of the container's code.

Specifically, the agent 132 is configured to provide the container 151 with a complete set of interfaces to the computing environment. That is, any input to or output generated by the container 151 is received or sent through the agent 132. As an example, the agent 132 interfaces between the container 151 and the IDE 131, the server 140, an operating system of the computing device 130, and a file system of the computing device 130. The agent 132 is also configured to install all software resources required for the execution of the container 151 on the computing device 130.

As noted above, the container 151 includes software resources and the agent 132 is configured to select software resources that are needed for the proper execution of the container's 151 code. In certain configurations, different versions of the container's 151 code are also saved. It should be noted that the agent 132 can check which resources are required for installation and which are not. For example, if the container's 151 is coded in Python, the agent installs a Python native in the container 151. As such, the container 151 can be executed on any computer regardless of whether the computer includes or does not include a Python native. Alternatively, the container 151 may call for installation of a Python native on-the-fly. Thus, for example, if the agent 132 detects that the operating system of the device 130 does not support Python, then the agent 132 causes installation of the native Python on the device 130, on-the-fly. It should be appreciated that this technique does not require the user to install any files and further allows seamless sharing and execution of containers across different devices.

In another embodiment, the agent 132 is further configured to provide the IDE 131 with the code included in the container 151 to enable the display of such code in the IDE 131.

The agent 132 is configured to generate a user interface such as, e.g., a graphical user interface (GUI), based on the container's code. The developer of the container does not need to code any GUI for inputting data or outputting the results. The agent 132 may be configured to receive indications of which variables are input variables. In another embodiment, the specified input variables may be automatically determined based on the container's code. Automatically determining input variables is described further herein below with respect to FIG. 3.

The agent 132 is configured to scan the code, to identify the specified input variables and their types, to generate GUI elements for such variables, and to display the generated GUI elements according to a specific order in which the inputs for the computational algorithm should be received. The agent 132 is further configured to provide at least one output window for displaying the execution's results.

Figure 2A:
FIGS. 2A and 2B are screenshots utilized to describe the creation of GUI components according to an embodiment.
Figure 2B:
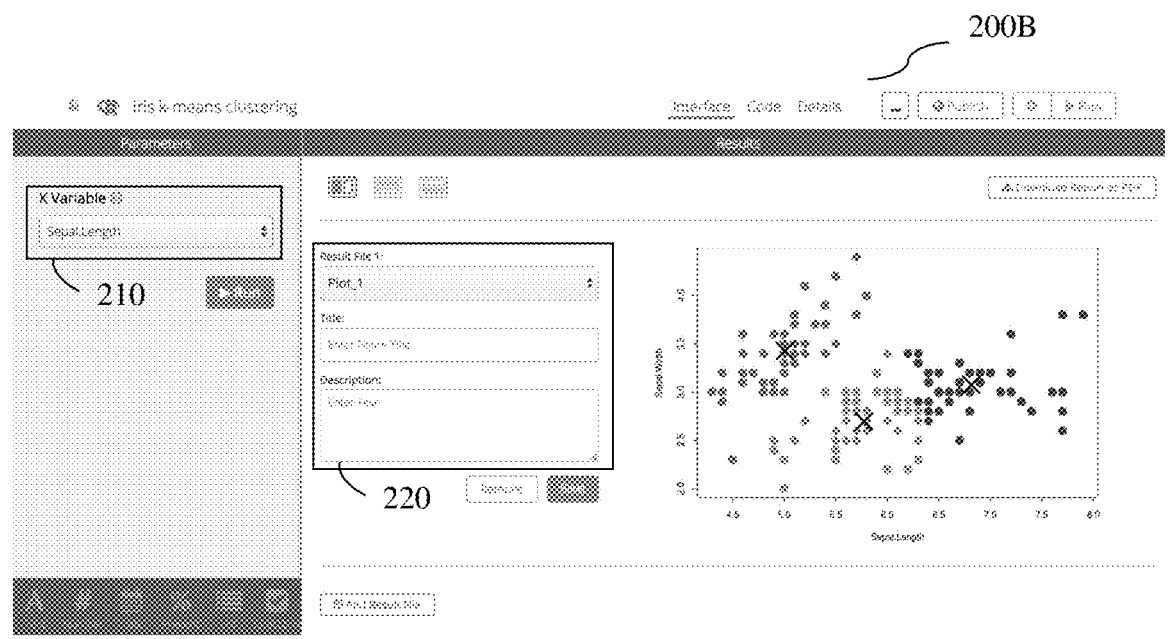

The GUI elements generated according to the disclosed embodiments may include, but are not limited to, dropdown menus, text boxes, combo boxes, input files, and so on. For example, FIG. 2A shows a GUI interface 200A utilized for evaluating a k-means clustering algorithm. An input GUI element, dropdown menu 210, is used for providing an input parameter "sepal.length". As shown in FIG. 2B, upon running the container with the algorithm's code, output GUI elements 220 are displayed. Such output GUI elements 220 prompt the user to select how to save the execution's results.

It should be noted that the dropdown menus 210 and output GUI elements 220 are not part of a k-means clustering algorithm, but are added during the run-time of the container's code by the agent 132.

Certain tasks as performed by the agent 132 can also be carried out, alternatively or collectively, by the server 140. In an embodiment, the container 151 can be executed by the server 140 and its inputs and outputs will be sent to the agent 132 through an API. As an example, a container 151 for computing averages can receive an input data set (e.g., a list of student grades) provided to the server 140 by the agent 132, and upon execution of the container 151 by the server 140, the average of the student grades is returned to the agent 132. The input data set is part of the container 151.

It should be appreciated that the generated GUI enables easy and fast interaction with the executed computational algorithm. For example, a user evaluating the computational algorithm is not required to enter a series of datasets through a command line.

In order to allow execution of a container 151, the server 140 is configured to create a computing environment that supports the execution of the container 151. For example, if a container 151 includes a Python code, a virtual machine (not shown) that can run Python is instantiated by the server 140. In an embodiment, the creation of computing environments for running containers 151 can be performed on-demand (e.g., upon receiving a request to run a container). In another embodiment, computing environments utilized by "popular" containers are always available.

It should be noted that the disclosed embodiments allow a programmer or other individual to evaluate any computational algorithm mentioned in a printed publication without writing and programming code or integrating the code in an existing computing environment. This allows the user to compare and contrast the different algorithms mentioned in different publications reviewed by the user. To this end, a predefined input data set may be utilized by multiple containers designed to execute similar algorithms. The server 140 is configured to execute each container and measure performance parameters. Such parameters may include global parameters, specific parameters, or both. The global parameters are agnostic to the purpose of the algorithm, while the specific parameters are related to the purpose of the algorithm, the function of the algorithm, or both. For example, global parameters may include execution time, memory, CPU, bandwidth utilization, and so on. The specific parameters may be, for example, a compression ratio for lossless compression algorithms.

In another embodiment, additional insights can be generated and provided as information layers to a particular printed publication. For example, the information layers may include, but are not limited to, performance related to executing the computational algorithm discussed in the article in different computing environments, which equations of the algorithm are required for the execution of the process, similar computational algorithms discussed in different printed publications, and so on.

In another embodiment, the server 140 and the agent 132 can interface with a reference management system 170. Typically, the reference management system 170 is a database of printed publications which allows an auditor of a printed publication to easily add citations to the printed publication. Each reference in the reference management system 170 is associated with metadata. The metadata include bibliographic information such as, for example, a title, authors, a publication date, and so on. Associating a reference publication with the metadata may include, but is not limited to, adding a container identifier of a referenced container associated with the reference publication to the metadata. A referenced container may be a container identified based on the metadata.

The metadata can be also supplemented by additional pieces of information from the server 140 by the agent 132, or both. Such information may include, but is not limited to, a container creation date, a container's code type, a user interaction, combinations thereof, and so on. The user interaction indicates how users downloaded or executed a specific container, the number of repetitions of a container per user, the number of runs, the number of views, a benchmark, combinations thereof, and so on. In an example embodiment, a ranking process is implemented to rank matching containers to a user query respective of the generated metadata. The ranking may be based, in part, on the user interaction information contained in the metadata. For example, a ranking score indicative of the popularity of a container may be computed using the number of runs, the number of views, and the number of downloads. The containers and their respective printed publications may be ranked based on the computed ranking scores.

In an embodiment, the metadata of a reference publication maintained in the reference management system 170 is enriched with a container identifier of a container that corresponds to the reference publication. As a result, when a citation is added to a printed publication, the author and the reader of the publication can easily access the respective container associated with the publication in the citation. Such a container can be represented using a special icon indicating that a container is available and the programming language and environment the container supports.

In a further embodiment, when a user reads a printed publication with a citation featuring a container identifier, the agent 132 is configured to detect any container identifier associated with any citation reviewed by the user. The agent 132 may further be configured to launch a widget displaying the container's contents. In an embodiment, the widget may be launched when the reader hovers over a citation.

In yet another embodiment, the IDE 131 (possibility under the control of the agent 132) is configured to identify functions as a programmer writes program code and to retrieve the containers that are related to the identified functions. The retrieved containers are containers that can implement/execute the identified function and are in a language supported by the program's code. For example, if the programmer writes a program using Matlab® that calls for an image compression function, then potential container(s) that include Matlab® code for image compression functions will be retrieved and displayed to the programmer. In an example implementation, the containers are retrieved and displayed as the IDE 131 identifies a code line calling for an image compression function.

In some implementations, the server 140 typically includes a processing circuitry (not shown) connected to a memory (not shown). The memory contains a plurality of instructions that, when executed by the processing circuitry, configure the server 140 to perform the embodiments disclosed herein. Specifically, the memory may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The processing circuitry may comprise or be a component of a larger processing circuitry implemented with one or more processors. The one or more processors may be implemented with any combination of general-purpose microprocessors, microcontrollers, digital signal processors (DSPs), field programmable gate array (FPGAs), programmable logic devices (PLDs), graphics processing units (GPUs), controllers, state machines, gated logic, discrete hardware components, dedicated hardware finite state machines, or any other suitable entities that can perform calculations or other manipulations of information.

In some implementations, the agent 132 can operate and be implemented as a stand-alone program or, alternatively, can communicate and be integrated with other programs or applications executed in the client device 130.

It should be understood that the embodiments disclosed herein are not limited to the specific architecture illustrated in FIG. 1 and that other architectures may be equally used without departing from the scope of the disclosed embodiments. Specifically, the server 140 may reside in the cloud computing platform 110, a different cloud computing platform, or a datacenter. Moreover, in an embodiment, there may be a plurality of servers 140 operating as described hereinabove and configured to either have one as a standby, to share the load between them, or to split the functions between them.

It should be noted that a single computing device 130 with the IDE 131 and the agent 132 is described herein with respect to FIG. 1 merely for simplicity purposes and without limitation on the disclosed embodiments. Multiple computing devices, each featuring IDEs, agents, or both, may be utilized in conjunction without departing from the scope of the disclosed embodiments.

Figure 3:
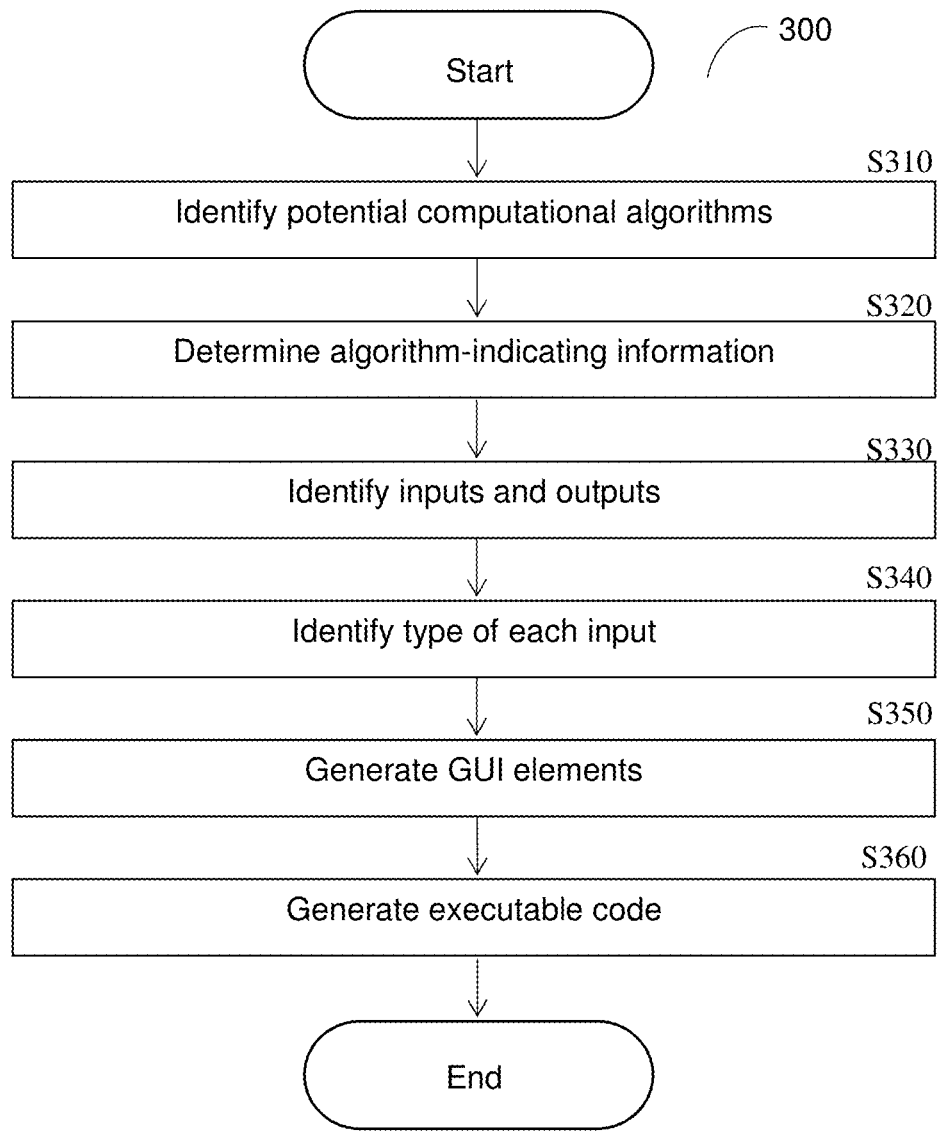
FIG. 3 is a flowchart illustrating a method for generating a GUI based on a computational algorithm according to an embodiment.

FIG. 3 is an example flowchart 300 illustrating a method for automatically providing a graphical user interface (GUI) for a computational algorithm described in a printed publication according to an embodiment. In an embodiment, the method may be performed by the server 140 or the agent 132.

The method may be performed in addition to a method for evaluating computational algorithms described in printed publications such that the provided GUI may be utilized to receive inputs and to display outputs of the evaluated computational algorithms. An example method for evaluating computational algorithms described in printed publications is discussed further in the above-noted U.S. patent application Ser. No. 15/185,538, which is incorporated by reference.

At S310, a printed publication is analyzed to identify a potential computational algorithm described therein. The printed publication may be displayed on a computing device (e.g., the computing device 130), or may include at least a portion of a printed publication that may be captured (e.g., via a camera installed on a computing device). In an embodiment, the printed publication may be an electronic publication featuring content such as, but not limited to, textual content, media content (e.g., images, videos, sounds, etc.), and so on. In a further embodiment, the analysis includes identifying content such as, but not limited to, textual content, media content (e.g., images, videos, sounds, etc.), and so on.

At S320, the contents of the printed publication are analyzed to determine information indicating a computing algorithm. Such algorithm-indicating information may include, but is not limited to, pseudo code, a code sample, an executable code, equations, a textual description of an algorithm, and so on. The analysis may include performing computerized textual, visual, or sound analysis, or a combination thereof, on the printed publication to identify the algorithm-indicating information.

At S330, the determined algorithm-indicating information is analyzed to identify at least one input required by the indicated algorithm and at least one output to be produced by the algorithm. An order of the identified inputs and outputs within executable code may also be determined. The order of the inputs and outputs may be utilized to determine locations of GUI elements for the inputs relative to other input GUI elements and to output GUI elements.

At S340, the identified inputs are analyzed to identify a type of each input. Example input types include, but are not limited to, textual inputs (e.g., alphanumerical), buttons, radio inputs (i.e., set of buttons, only one of which may be selected), check boxes, and the like. In an embodiment, S340 may further include identifying one or more input restrictions. Example input restrictions include, but are not limited to, limitations on length of inputs (e.g., a number of characters allowed), accepted data types (e.g., characters, strings, binary values, integer values, etc.), and so on.

At S350, at least one GUI element is generated. A GUI element may be generated for each user-provided input. At least one GUI element may also be generated for the identified outputs. Further, a GUI element may be generated for each identified output.

At S360, executable code is generated based on the at least one GUI element. In an embodiment, upon execution, the code causes a display of a GUI including the generated GUI elements. In a further embodiment, the code is generated further based on the identified order of inputs and outputs such that each of the generated GUI elements is displayed in a location within the GUI corresponding to the input or output associated with the GUI element.

In an embodiment, the code for rendering the GUI is generated during the execution of a container of the computational algorithm. Such code, once generated, is added to the container. The code rendering the GUI may be cached, for example, in a cache memory (not shown) connected to the server 140. The cached resources may include, for example, installation files, compilation files, results output by the container, combinations thereof, and the like.

In some implementations, the cache memory can be shared among different computing environments (referred to herein as "workers") created to execute the containers. This sharing of cache memory allows for sharing cached GUI code among the computing environments. It should be appreciated that the cached GUI code produced in one worker can be used by other workers without requiring re-compilation, thereby increasing efficiency of access by accelerating the execution and accessibility to containers. It should be noted that the cached GUI code is available to containers executed by the agents or to the server.

As a non-limiting example, a printed publication including the following pseudo-code for a grading program in Python is analyzed:

```
grading.py
name = input ('Student name:') #Dropdown: Joe, Susan, Mark, Julie
for x in range (1, 3):
    grade = input ('Assignment ' + x + ' Grade:')
    total += grade
average = total / 3
print ('Average grade is: ' + average)
```

The pseudo-code is identified as algorithm-indicating information of a potential computational algorithm. The inputs "name" and "grade" are identified based on the pseudo-code including Python "Input" statements. The output "'Average grade is: '+ average" is identified based on the pseudo-code including a Python "Print" statement. The type of each of the "name" and "grade" inputs is determined to be a textual input. GUI elements including textual input boxes and a text box for output are generated. Based on the GUI elements, executable code for causing display of a GUI is generated. An example diagram 400 illustrating a sample output of such executable code is shown in FIG. 4.

The Dropdown keyword "# Dropdown" designates a dropdown menu to be generated in the GUI. That is, the dropdown menu is identified in the code and GUI including a dropdown menu is generated. The dropdown's values may include the value designated keyword # Dropdown. It should be noted the special type of GUI elements may be generated without identification of the special keywords, but based on the identification of special characters, such as comma, semicolon, and the like.

The various embodiments have been discussed herein with reference to a software container. The software container can be replaced with a virtual machine, a light virtual machine, or any applicable virtualization technologies without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing a graphical user interface (GUI) based on a computational algorithm described in a printed publication, comprising:
    analyzing the printed publication to determine algorithm-indicating information of the computational algorithm;
    identifying, in the algorithm-indicating information, at least one input required by the computational algorithm and at least one output to be output by the computational algorithm;
    generating, based on the at least one input and the at least one output, at least one GUI element; and
    generating executable code, wherein the executable code includes instructions for causing a display of the GUI including the at least one GUI element.

2. The method of claim 1, further comprising:
    determining an order for the identified at least one input and the identified at least one output; and
    determining, for each generated GUI element, a location of the generated GUI element within the GUI based on the determined order, wherein the executable code is generated based further on the determined order.

3. The method of claim 1, further comprising:
    identifying an input type of each input, wherein the at least one GUI element is generated based further on the identified at least one input type.

4. The method of claim 1, wherein the generated at least one GUI element includes a GUI element generated for each input and at least one GUI element generated for the at least one output.

5. The method of claim 1, wherein analyzing the printed publication further comprises performing at least one of computerized textual analysis, computerized visual analysis, and computerized sound analysis.

6. The method of claim 1, wherein the algorithm-indicating information includes at least one of: pseudo code, a code sample, an executable code, equations, and a textual description of an algorithm.

7. The method of claim 1, wherein the executable code is generated based on GUI-rendering code generated during execution of a container of the computational algorithm.

8. The method of claim 7, wherein the GUI rendering code is cached in a cache memory.

9. The method of claim 8, wherein the cache memory is shared among a plurality of computing environments, wherein the GUI-rendering code is accessible to each of the plurality of computing environments.

10. A non-transitory computer readable medium having stored thereon instructions for causing a processing circuitry to execute a process, the process comprising:
    analyzing a printed publication to determine algorithm-indicating information of a computational algorithm;
    identifying, in the algorithm-indicating information, at least one input required by the computational algorithm and at least one output to be output by the computational algorithm;
    generating, based on the at least one input and the at least one output, at least one graphical user interface (GUI) element; and
    generating executable code, wherein the executable code includes instructions for causing a display of a GUI including the at least one GUI element.

11. A system for providing a graphical user interface (GUI) based on a computational algorithm described in a printed publication, comprising:
    a processing circuitry; and
    a memory, the memory containing instructions that, when executed by the processing circuitry, configure the system to:
    analyze the printed publication to determine algorithm-indicating information of the computational algorithm;
    identify, in the algorithm-indicating information, at least one input required by the computational algorithm and at least one output to be output by the computational algorithm;
    generate, based on the at least one input and the at least one output, at least one GUI element; and
    generate executable code, wherein the executable code includes instructions for causing a display of the GUI including the at least one GUI element.

12. The system of claim 11, wherein the system is further configured to:
    determine an order for the identified at least one input and the identified at least one output; and
    determine, for each generated GUI element, a location of the generated GUI element within the GUI based on the determined order, wherein the executable code is generated based further on the determined order.

13. The system of claim 11, wherein the system is further configured to:
    identify an input type of each input, wherein the at least one GUI element is generated based further on the identified at least one input type.

14. The system of claim 11, wherein the generated at least one GUI element includes a GUI element generated for each input and at least one GUI element generated for the at least one output.

15. The system of claim 11, wherein analyzing the printed publication further comprises performing at least one of computerized textual analysis, computerized visual analysis, and computerized sound analysis.

16. The system of claim 11, wherein the algorithm-indicating information includes at least one of: pseudo code, a code sample, an executable code, equations, and a textual description of an algorithm.

17. The system of claim 11, wherein the executable code is generated based on GUI-rendering code generated during execution of a container of the computational algorithm.

18. The system of claim 17, further comprising:
    a cache memory, wherein the GUI rendering code is cached in the cache memory.

19. The system of claim 18, wherein the cache memory is shared among a plurality of computing environments, wherein the GUI-rendering code is accessible to each of the plurality of computing environments.

* * * * *